United States Patent [19]
Burrows

[11] Patent Number: 5,303,302
[45] Date of Patent: Apr. 12, 1994

[54] NETWORK PACKET RECEIVER WITH BUFFER LOGIC FOR REASSEMBLING INTERLEAVED DATA PACKETS

[75] Inventor: Michael Burrows, Palo Alto, Calif.

[73] Assignee: Digital Equipment Corporation, Maynard, Mass.

[21] Appl. No.: 900,844

[22] Filed: Jun. 18, 1992

[51] Int. Cl.$^5$ .......................... H04L 9/00; H04J 3/02
[52] U.S. Cl. .......................................... 380/49; 380/9; 380/36; 380/50; 370/29; 370/58.1; 370/60; 370/94.1; 370/110.1
[58] Field of Search ................. 370/29, 58.1–58.3, 370/99, 102, 103, 110.1, 60, 94.1; 380/9, 33, 36, 37, 49, 50; 375/20

[56] References Cited

U.S. PATENT DOCUMENTS 4,796,256 1/1989 Opderbeck et al. ............. 370/110.1

*Primary Examiner*—Bernarr E. Gregory
*Attorney, Agent, or Firm*—Flehr, Hohbach, Test, Albritton & Herbert

[57] ABSTRACT

A network controller receives encrypted data packets in the form of interleaved streams of cells, and stores the received cells in a buffer until the end of each packet is received, at which time the complete packet is decrypted, error checked, and then transmitted to a host computer. The network controller's buffer includes a data storage array in which data packets are stored as linked lists, and a packet directory having a entry for each data packet stored in the buffer. Each directory entry contains a pointer to the first and last location in the buffer where a corresponding data packet is stored, as well as status information for the data packet. When free space in the network controller's buffer falls below a specified threshold, the network controller transmits selected partial packets to the host computer without decrypting or error checking, and also stores in its packet directory entry for each transmitted partial packet a "partial transfer" status flag. Additional portions of the partial packets may be sent to the host computer with an indication of the packet to which they belong. Upon receiving the end of a data packet that was partially transferred to the host computer, the remainder of the data packet in the packet buffer is transmitted to the host computer, without decrypting or error checking the partial data packet. The host computer then transmits the complete packet through a loopback path in the network controller for decrypting and error checking.

11 Claims, 4 Drawing Sheets

NETWORK PACKET RECEIVER WITH BUFFER LOGIC FOR REASSEMBLING INTERLEAVED DATA PACKETS

The present invention relates generally to computer communication networks in which data packets are fragmented and interleaved on the same network cable, and particularly to the network controllers which receive, decrypt and then transfer such packets to a host computer.

BACKGROUND OF THE INVENTION

Referring to FIG. 1, in some computer networks each data packet 100 transmitted over the network is fragmented into smaller cells 110 (herein called data cells) for transmission over the network. Furthermore, as shown in FIG. 2, the data cells of different packets (e.g., packets simultaneously arriving at a particular host computer 120 (Host D) from different nodes 122, 124, 126 in the network) may be interleaved on the same network cable 128.

An example of such a network is any Asynchronous Transfer Mode (ATM) network. As shown in FIG. 1, in ATM networks, packets are transmitted in the form of data cells 110, each of which is 53 bytes long, including a five-byte header 130 and a 48-byte data portion 132. Each data cell's header 130 includes a "virtual circuit identifier" 134, discussed below, and a END flag 136 that is set only for the last cell of each data packet. For the purposes of this document, it can be assumed that there is no particular relationship between cell boundaries and either (A) the boundary between the "packet header" 138 and "packet body" 140, or (B) the boundary between the encrypted and unencrypted portions of the data packet 100.

For security reasons, data packets are usually encrypted using a public or private key encryption methodology. Furthermore, to ensure data integrity, a CRC error detection code is included in each packet, usually at the end of the packet, for detecting corrupted packets as well as for detecting packets that may have been tampered with in an attempt to break the system's security provisions. Therefore each packet received by the network controller must be decrypted and error checked by a CRC (cyclic redundancy check) circuit before it can be used by the host computer. However, it should be noted that the present invention is also applicable to networks carrying unencrypted data packets.

In ATM networks there is usually an upper bound on the size of any one packet, such as 4K (4096) bytes, or perhaps 10,000 bytes. However, a very large number of packets can be interleaved at any one network controller (receiver).

The problem presented by interleaved, fragmented packets is how to make a network controller (i.e., the interface between a workstation or other host computer and the network cables) that can decrypt and CRC check these packets. Data packets are usually decrypted and CRC checked as a whole because it would be expensive to provide the support circuitry needed to multiplex commercially available CRC circuits so as to process interleaved packet portions. Assuming that a packet must be processed as a whole, the network controller will need to buffer all incoming packets, and then decrypt and CRC check each packet after the end of the packet is received. However, since there is virtually no upper bound on packet interleaving, the amount of buffer space needed in the network controller to handle incoming packets is virtually limitless.

One potential method of avoiding the need for unlimited buffer space in the network controller is to discard one or more incomplete data packets when the network controller buffer overflows. While discarding packets, by itself, is probably tolerable in most computer systems if it happens infrequently, it is much less tolerable when the host computer is unable to pick which packets to discard. Since some packets are more important for correct functioning of the system than others, an uninformed selection of which packets to discard by the network controller may cause disruption of the computer network.

SUMMARY OF THE INVENTION

In summary, the present invention is a system and method for preventing buffer overflow in a network controller's data packet receiver, for use in ATM networks. The network controller receives interleaved encrypted packets in the form of interleaved streams of data cells. The network controller stores the received data cells in a buffer until the end of each packet is received, at which time the complete packet is reassembled, decrypted, CRC error checked, and then transmitted or transferred to a host computer. The network controller buffer includes a data storage array and a packet directory having a entry for each data packet stored in the data storage array. Each directory entry contains a pointer to the first location in the data storage array where a corresponding data packet is stored, as well as status information for the data packet.

When the amount of data stored in the network controller's packet buffer exceeds a specified limit, indicating that the buffer may overflow if remedial action is not taken, the network controller selects at least one partial packet stored in the buffer and transmits the selected partial packet(s) to the host computer without decrypting or CRC error checking thereof. A message is sent to the host computer indicating that the transmitted packets are "incomplete". The network controller also stores in its packet directory entry for each transmitted partial packet a "partial transfer" status flag. If, after more data cells are received by the network controller, the packet buffer again reaches the specified limit without having received the end of the partial packets previously sent to the host computer, additional portions of the partial packets may be sent to the host computer with an indication of the packet to which they belong, as well as additional selected partial packets.

When the end of a data packet is received, and portions of that data packet were previously transferred to the host computer to prevent buffer overflow, the remainder of the data packet in the packet buffer is transmitted to the host computer, without decrypting or CRC error checking, along with a special "end of packet" message. The host computer then transmits the complete packet back to the network controller for decrypting and CRC error checking, using a hardware "loopback" in the network controller. If the host computer is so overloaded that discarding the packet is preferable to loopback, the host's software can chose to discard those packets that will not severely impact the system.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Descriptions of three network controllers will be presented. The job of each network controller is to receive from the network cable 128 cells representing interleaved data packets, process the received cells so as to construct complete data packets, and then transfer the data packets to the host computer 120. Each network controller has an internal data storage buffer for assembling complete data packets from interleaved streams of cells. For the purposes of these descriptions, the data packets being processed are assumed to contain encrypted data. However, the present invention can also be implemented for processing unencrypted data packets.

"Buffer overflow" is herein defined to be the condition that occurs when the data storage buffer is insufficiently large to store all the partial data packets which have been received by the network controller, resulting in the loss of one or more data packets. Each of the three network controllers described below deals with or avoids "buffer overflow" in a different way.

Figure 3:
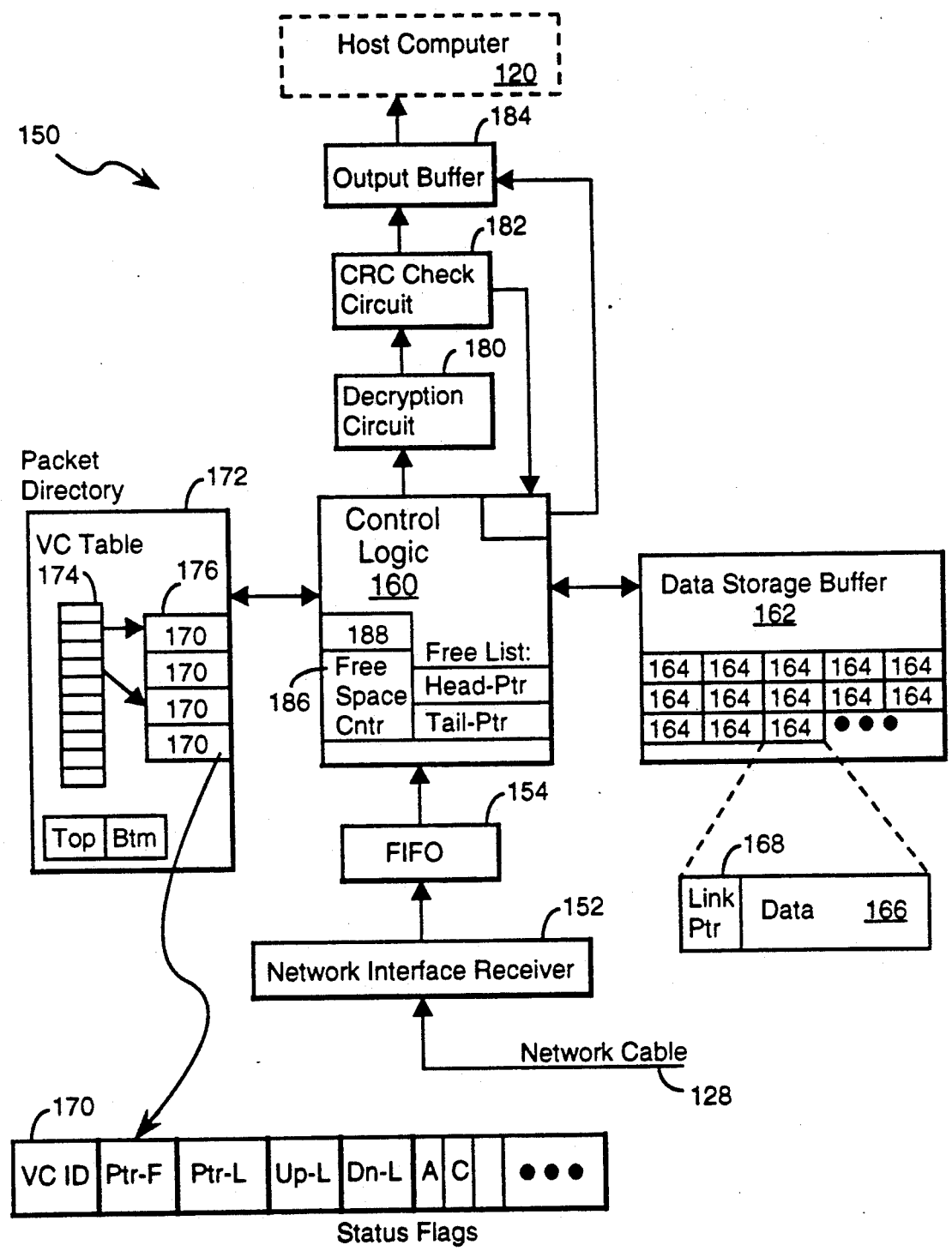
FIG. 3 is a block diagram of a network controller implementing one potential method for handling interleaved packets.

The first network controller, shown in FIG. 3, reacts to buffer overflow by simply discarding selected partial data packets. The second network controller, shown in FIG. 4, uses modified decryption and CRC error detection circuits that can process multiplexed data packets, thereby allowing that network controller to send portions of data packets to the host computer 120, and to delete those data packet portions from its data storage buffer so as to prevent buffer overflow. The third and preferred network controller, shown in FIG. 5, uses the host computer's memory as an extension of the controller's data storage buffer, plus a packet loopback mechanism, to avoid buffer overflow.

NORMAL OPERATION OF NETWORK CONTROLLER

Referring to FIG. 3, there is shown the receiver portion of a first network controller 150 that processes interleaved data packets received from an ATM network. Cells received by the controller 150 from network cable 128 are captured by a network interface receiver 152 and then temporarily stored in a FIFO (first in first out) buffer 154. Control logic 160 reads the header of each received cell from the FIFO 154 and then stores the data portion of the received cell in a data storage buffer 162. The data storage buffer 162 is typically high speed random access memory (RAM). The amount of RAM provided depends on expected usage of the network controller, including packet sizes and expected maximum number of interleaved packets, and is generally sufficient to handle a reasonable number of interleaved data packets. More particularly, the buffer 162 should be sized so that buffer overflow occurs only very rarely (e.g., not more than once every few hours, on average).

Each data packet is stored in the buffer 162 as a linked list of data blocks, where each data block 164 contains 48 bytes of data 166 (i.e., the data portion 132 of one cell) and a linking pointer 168 (which may be, for example, two bytes long). Each such linked list of data blocks has a header comprising an entry 170 in a packet directory 172.

The packet directory 172 contains a virtual circuit table 174, and an array 176 of packet entries or records. The virtual circuit table 174 contains pointers to the packet entries representing each of the packets being received by the controller 150. For the purposes of this document, it can be assumed that each packet being received by the controller has a unique "virtual circuit identifier". Another way to state this is that only one packet can be transmitted at a time over each virtual circuit between the host computer 120 and other computers on the network.

Figure 1:
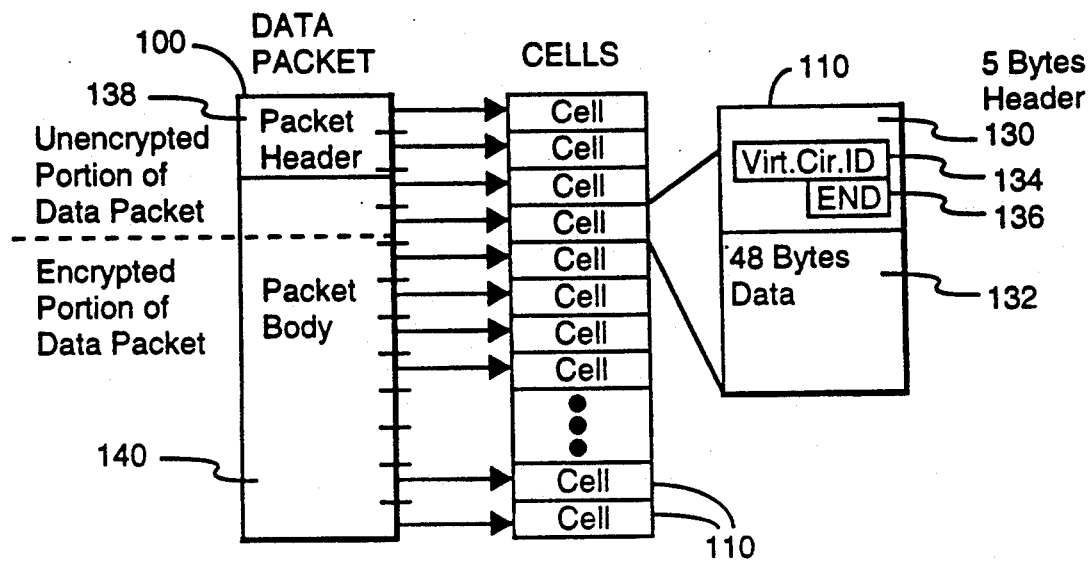
FIG. 1 is a block diagram of a data packet and the corresponding data cells into which the packet is fragmented for purposes of transmission over a network.
Figure 2:
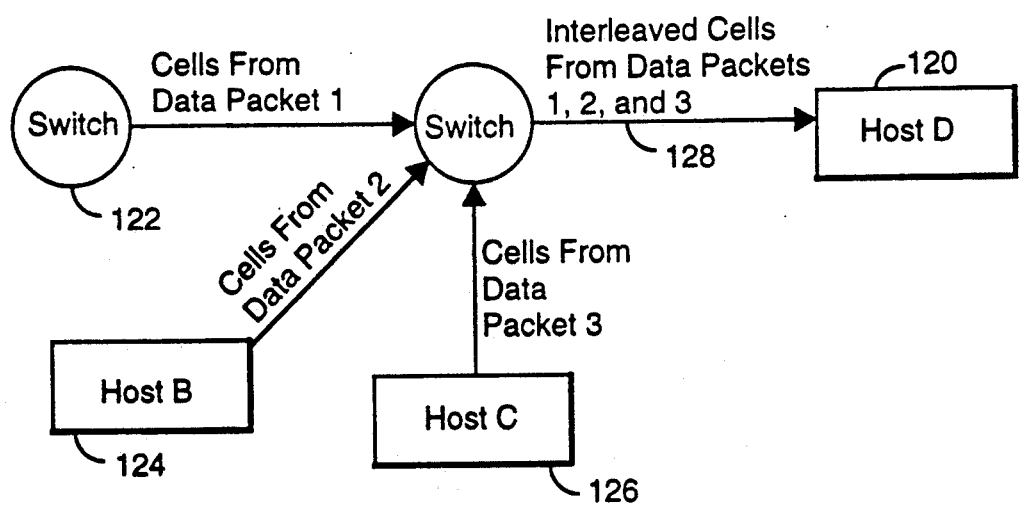
FIG. 2 is a block diagram of a portion of a computer network in which packets from several nodes of the network are all arriving at a particular destination node during overlapping time periods, causing the cells of the arriving packets to be interleaved.

When a cell is received by the controller 150, the cell's virtual circuit identifier 134 (see FIG. 1) is used as an index into the virtual circuit table 174, from which is obtained a pointer to the packet entry 170 associated with that cell. Thus the virtual circuit table 174 is essentially an indirect address generator for accessing the array 176 of packet entries. When the first cell of a data packet is received, there is no entry in the virtual circuit table for that packet, nor is there a corresponding packet entry 170 in array 176. The control logic 160 selects an unused entry 170 in array 176 for the new packet, and makes a corresponding entry in the virtual circuit table 174.

The packet directory entry 170 for a data packet includes the following fields:

the packet's virtual circuit identifier (VC ID);
pointers Ptr-F and Ptr-L to the first and last data blocks 164 in the data storage buffer for the packet, marking the head and tail of the linked list of data blocks;
pointers Up-L and Dn-L, used to maintain a doubly-linked list of the packet entries 170 in the packet directory 172; and
status flags, used to indicate the packet's status. For instance, status flag "A" is set whenever the packet entry represents a packet having at least one block in the data storage array, and flag "C" is set when the last cell of a packet has been received, indicating the packet is complete.

The data storage buffer 162 is formatted as an array of blocks 164. Furthermore, through use of the link pointers 168, every block in the buffer 162 is either part of the linked list for a data packet having a header in the packet directory, or is on a linked list called the Free List. The control logic 160 maintains a Head-Ptr which points to the first block in the Free List, and a Tail-Ptr that points to the last block of the Free List. As cells are received from the network, the data blocks needed to store those cells are taken from one end (the head) of the Free List, and added to the end of a packet's linked list. After a data packet is sent to the host computer, the data packet is deleted from the buffer 162 by placing the data blocks formerly used to store that data pocket on the other end (the tail) of the Free List. Maintenance of such linked lists is well known to those skilled in computer programming.

During normal operation, when the last cell of a packet is received by the controller 150, the control logic 160 stores that cell's data in the data storage buffer 162 and then initiates the process of transmitting the entire data packet to the host computer 120. It should be remembered that at this point in time the data packet is still encrypted and has not yet been error checked. The process of decrypting and error checking the data packet is pipelined so that it is performed as the data is transmitted to the host computer 120, preferably using DMA (direct memory access) data transmission. In particular, the control logic 160 retrieves the data packet from the buffer 162 and routes it through a decryption circuit 180 that decrypts the encrypted portions of the data packet. As portions of data packet emerge from the decryption circuit 180, it is error checked, in pipelined fashion, by CRC check circuit 182. The CRC check circuit 182 accumulates a CRC value for the entire data packet, and sends an error signal to the control logic 160 if the final CRC value indicates that the data packet contains invalid data. From the CRC check circuit 182 the data packet is transmitted to the host computer 120 via an output buffer 184 that typically contains DMA logic circuitry for directly storing the data packet in the host computer's memory. While only a small amount of information is processed by the decryption and error checking circuits 180, 182 at any one time, the entire packet is sequentially processed by these circuits as the data packet is transmitted to the host computer 120.

If the CRC circuit 182 determines that the packet has invalid data, the control logic 160 sends a special command to the output buffer 184, which then loads an error message into the memory of the host computer 120. This error message is sent to the host computer immediately after the end of the packet is sent. The host computer 120 is typically programmed to look for such error messages from the controller 150 in a particular portion of its memory and to discard any received packets that are flagged as being invalid by an error message.

Figure 4:
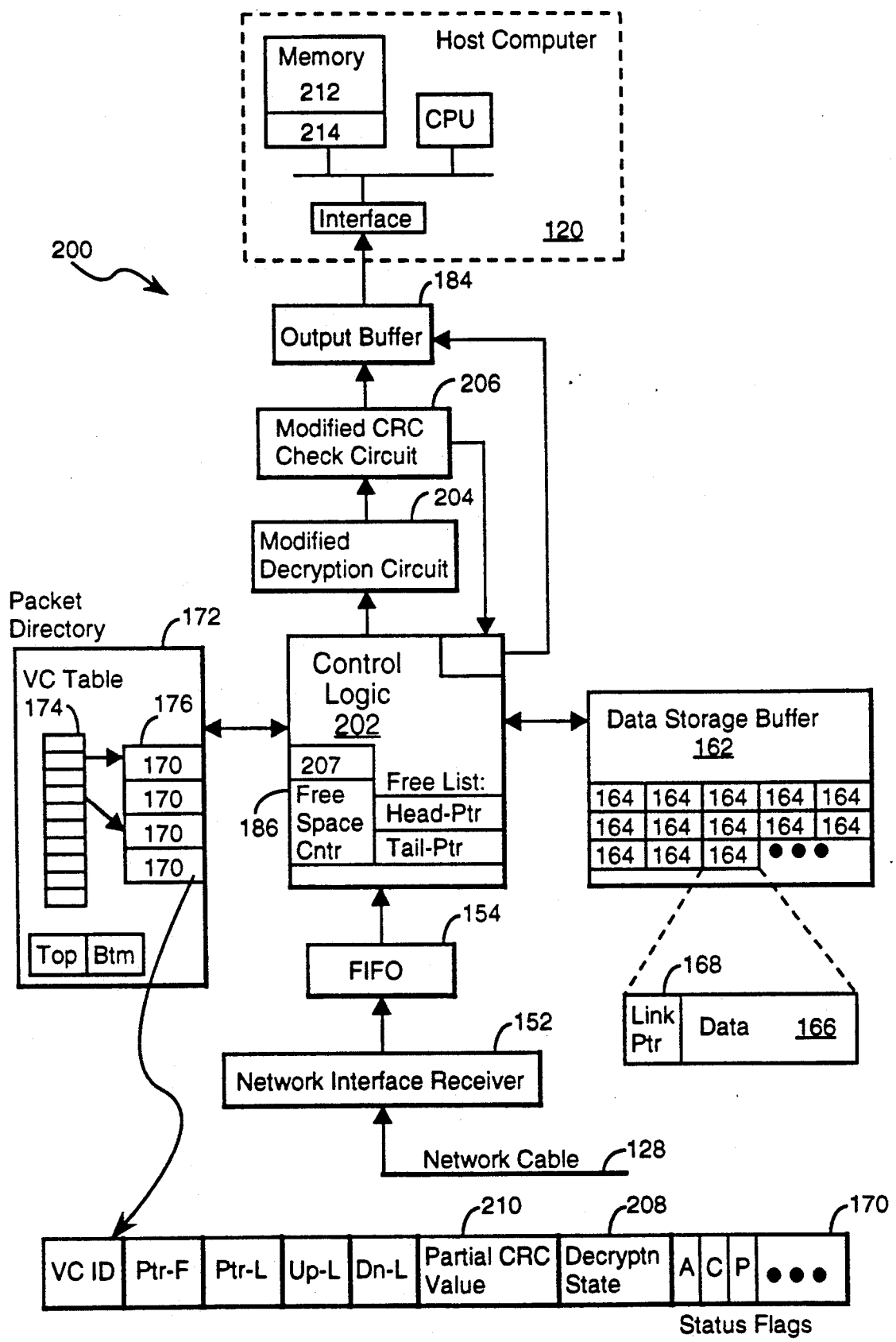
FIG. 4 is a block diagram of a network controller implementing a second potential method for handling interleaved packets.
Figure 5:
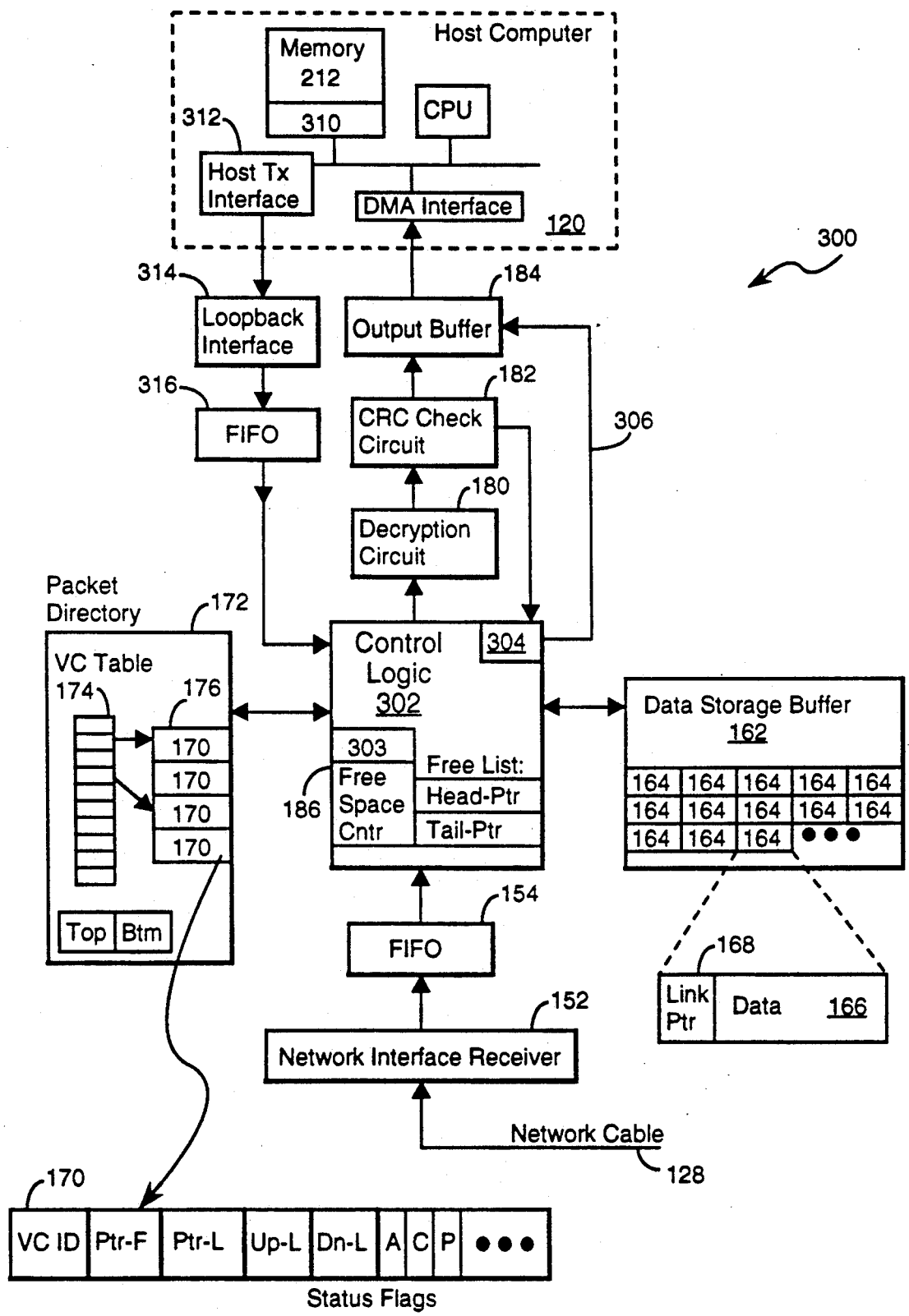
FIG. 5 is a block diagram of a network controller implementing a preferred embodiment of the present invention for handling interleaved packets.

The above description of "normal operation" of the host controller 150, which herein means operation of the host controller 150 so long as the data storage buffer 162 does not overflow, is also applicable to the host controllers shown in FIGS. 4 and 5.

DETECTING AND MANAGING BUFFER OVERFLOW

Next explained is how each host controller responds to overflow of the data storage buffer 162, which primarily happens when too many interleaved data packets are received by the host controller.

Another potential cause of buffer overflow is the receipt of incomplete data packets. For instance, if the beginning portions of a data packet are received and stored in the data storage buffer 162, but the end of the packet is never received, the space in data storage buffer 162 occupied by that incomplete packet is lost, at least until something happens which causes the controller to delete the incomplete packet. A packet may be made incomplete, for instance, by transmission errors or by failure of a network switch.

Receiving another packet with the same virtual circuit identifier as the incomplete packet will cause the incomplete packet to be cleared, indirectly, because the new packet will be tacked onto the previous packet by the host controller. When the resulting combined packet is sent to the host computer, it will be identified as having an error by the CRC checking circuit 182, and both packets will be lost.

First Network Controller: Selecting A Packet To Delete

Still referring to FIG. 3, the control logic 160 includes a free space counter 186 that keeps track of the number of unused blocks 164 in the data storage buffer 162 (i.e., the number of blocks on the Free List). Whenever the number of unused blocks 164 falls below a predefined threshold, indicative of imminent buffer overflow, overflow control logic 188 in the control logic 160 (of the controller 150 in FIG. 3) deletes one of the partial data packets stored in the data storage buffer, and clears the corresponding entries in the packet directory 172.

The preferred method of selecting a partial data packet for deletion in the host controller 150 of FIG. 3 is to delete the packets that have been "dormant" or "inactive" (i.e., for which no new cells have been received) the longest. As stated above, the pointers Up-L and Dn-L found in each packet directory entry 170 are used to maintain a doubly-linked list of the active packet entries 170 (i.e., those representing data packets having at least one block 164 of data stored in the buffer 162) in the packet directory 172. The control logic 160 maintains these Up-L and Dn-L pointers, as well as Top and Btm indicators in the Packet Directory 172 for pointing to the top and bottom entries of the doubly-linked list of packet entries.

Each time that a new cell is received by the network controller 150, the control logic 160 moves the associated packet entry 170 to the top of the packet entry list. As a result, at any point in time, the packet entries at the bottom of the packet entry list represent those packets which have been inactive the longest. For example, data packets whose transmission has been interrupted by a hardware or software error will tend to be at the end of the packet entry list. Similarly, if a cell was received with an invalid or corrupted virtual circuit identifier, the data packet entry corresponding to that cell would also be likely to found at or near the bottom of the packet entry list.

Whenever the number of unused blocks falls below a predefined threshold, indicative of imminent buffer overflow, the control logic 160 of the controller 150 in FIG. 3 deletes the partial data packet represented by the last entry in the packet entry list. The data blocks 164 for that packet are added to the end of the data block Free List, and the corresponding entry in the packet directory 172 is cleared.

Since deleting a partial data packet is a very fast operation, the threshold for imminent buffer overflow in the controller 150 of FIG. 3 is governed not by the amount of time required for deleting a partial packet, but rather by the worst case amount of time required to transmit a complete packet to the host computer. For instance, if data can be transmitted to the host computer at a rate that is N times faster than the rate at which it can be received from the communications network cable 128, then the free space threshold will be approximately equal to the size of the largest allowed data packet (measured in units of 48-byte data blocks) divided by N, plus a constant K for (A) initiating a DMA transfer to the host computer, (B) communicating the results of the CRC error check to the host computer, and (C) adding the data packet's blocks to the Free List and clearing the corresponding entries in the packet directory 172.

The disadvantage of this methodology of handling buffer overflow in the host controller 150 is that the host computer 120 does not get to select which data packets to delete. As a result, data packets important to the networks operation, such as a data packet with network reconfiguration information, may be inadvertently deleted by the host controller 150.

Second Network Controller: Avoiding Data Buffer Overflow By Interleaved Decryption and Error Checking Referring to FIG. 4, the receiver portion of a second network controller 200 is shown. During normal operation the operation of this network controller 200 is the same as for the network controller 150 shown in FIG. 3. Furthermore, as in the first network controller, the control logic 202 of second network controller 200 maintains a doubly-linked list of packet entries 170 in the packet directory 172, and the control logic 202 includes a free space counter 186 that keeps track of the number of unused blocks 164 in the data storage buffer 162 (i.e., the number of blocks on the Free List).

The standard decryption and CRC checking circuits 182, 180 of FIG. 3 can only process whole data packets. However, the network controller 200 of FIG. 4 has a modified decryption circuit 204 and a modified CRC checking circuit 206 which can decrypt and error check data packets in several pieces, as will be explained below.

Whenever the number of unused blocks falls below a predefined threshold, indicative of imminent buffer overflow, overflow prevention logic 207 in the control logic 202 (of the controller 200 in FIG. 4) selects the partial data packet referenced by the packet entry at the bottom of the packet entry list, and then transmits that partial packet to the host computer 120 through the modified decryption and CRC error checking circuits 204, 206. The decryption state value required to resume decryption of the rest of the data packet is stored in field 208 of the packet's entry 170, the partial CRC value required to resume CRC error checking of the rest of the data packet is stored in field 210, and a "partial transfer" status flag P in the packet entry 170 is set. The data blocks 164 occupied by the partial packet sent to the host computer are added to the end of the Free List, thereby "deleting" the partial packet from the buffer 162. The transmitted partial data packet is stored in the memory 212 of the host computer 120, generally at an address corresponding to the virtual circuit identifier for the data packet. The overflow prevention logic 207 also loads a special "partial data packet" message into the memory of the host computer 120 via output buffer 184.

If the partial data packet selected for transmission by the overflow prevention logic 207 already had previous portions transmitted to the host computer, as indicated by the P status flag in its packet directory entry 170 being set, the decryption state value in field 208 is loaded into the modified decryption circuit 204 and the partial CRC value in field 210 is loaded into the modified CRC circuit 206 before the selected partial data packet is transmitted to the host through the modified decryption and CRC error checking circuits 204, 206. Thus, a data packet may be sent in several pieces to the host computer.

When the end of a data packet is received by the host controller 200, as indicated by an END of packet flag in a received cell, the control logic 202 of this controller 200 must check the partial packet flag P of the corresponding packet entry 170 before transmitting the completed data packet to the host computer 120. If portions of data packet have already been partially transmitted to the host computer, as indicated by the P status flag in its packet directory entry 170 being set, the decryption state value in field 208 is loaded into the modified decryption circuit 204 and the partial CRC value in field 210 is loaded into the modified CRC circuit 206 before the rest of the completed data packet is transmitted to the host through the modified decryption and CRC error checking circuits 204, 206. If the CRC circuit 206 determines that the packet has invalid data, the control logic 202 sends a special command to the output buffer 184, which then loads an error message into the memory of the host computer 120. The control logic 202 also loads a special "end of data packet" message into the memory of the host computer 120 via output buffer 184.

The host controller 200 of FIG. 4 does not discard data packets. Software 214 in the host computer 120 determines which, if any, data packets to discard. For instance, the host computer's software 214 might discard a partial data packet if the data packet is not completed within a given amount of time.

The main disadvantage of the host controller 200 of FIG. 4 is that it would be expensive to provide the support circuitry needed to multiplex commercially available CRC circuits so as to process interleaved packet portions or to design a modified CRC check circuit for processing interleaved packets. While those skilled in the art of designing CRC check circuits would have no difficulty designing such a modified CRC checking circuit, designing custom CRC checking circuits and/or CRC multiplexing support circuitry may not be practical or cost effective for the manufacturer of a network host controller.

Third Network Controller: Avoiding Data Buffer Overflow By Storing Partial Encrypted and Unchecked Packets In Host Referring to FIG. 5, the receiver portion of a third network controller 300 is shown. During normal operation the operation of this network controller 300 is the same as for the network controller 150 shown in FIG. 3. As in the first network controller 150, the control logic 302 of this third network controller 300 maintains a doubly-linked list of packet entries 170 in the packet directory 172, and the control logic 302 includes a free space counter 186 that keeps track of the number of unused blocks 164 in the data storage buffer 162 (i.e., the number of blocks on the Free List). The third network controller 300 has standard decryption and CRC checking circuits 180, 182.

Whenever the number of unused blocks falls below a predefined threshold, indicative of imminent buffer overflow, overflow prevention logic 303 in the control logic 302 (of the controller 300 in FIG. 5) selects the partial data packet referenced by the packet entry at the bottom of the packet entry list, and then transmits that partial packet to the host computer 120 via output control circuit 304 and path 306 through output buffer 184. Note that the partial data packet is sent to the host computer 120 without decrypting or error checking. The transmitted partial data packet is stored in the memory 212 of the host computer 120, generally at an address corresponding to the virtual circuit identifier for the data packet. In addition, the overflow prevention logic 303 loads a special "partial data packet" message into the memory of the host computer 120 via output buffer 184.

The overflow prevention logic 303 furthermore sets the "partial transfer" status flag P in the packet entry 170, and adds to the Free List the data blocks 164 of the transmitted partial data packet, thereby "deleting" the partial packet from the buffer 162.

If the controller's buffer 162 reaches the overflow point again before the end of the partially transferred packet is received, subsequent portions of that packet may be sent to the host computer using the same methodology as described above. Therefore it is possible for a data packet to be sent to the host computer in several pieces.

When the end of a data packet is received by the host controller 300, as indicated by an END of packet flag in a received cell, the control logic 302 of this controller 300 checks the partial transfer flag P of the corresponding packet entry 170 before transmitting the completed data packet to the host computer 120. If portions of data packet have already been partially transmitted to the host computer, as indicated by the P status flag in its packet directory entry 170 being set, the rest of the completed data packet is transmitted to the host through via output control circuit 304 and path 306 through output buffer 184. In other words, the entire data packet has now been loaded into the host computer's memory 212 without decrypting or error checking. The control logic 302 also loads a special "end of data packet" message into the memory of the host computer 120 via output buffer 184 to indicate that the entire packet has now been transmitted.

When packet processing software 310 in the host computer 120 receives the special "end of data packet" message from the host controller, it retransmits the received, encrypted data packet via its host transmission interface 312 back to a loopback interface 314 of the host controller 300. The loopback interface 314 is typically part of the transmission portion of the host controller 300 and would normally be used by the host computer 120 for testing the operation of the host controller by sending data packets through the host controller back to itself.

In the present invention, the software 310 sends data packets, previously transferred in portions by the host controller 300, through the loopback path so as to decrypt and error check those data packets. The data packet from the host computer is buffered by a FIFO 316. From there the loopback data packet is directed by the control logic 302 through the decryption circuit 180, CRC check circuit 182 and output buffer 184 back to the host computer 120.

As described above, in this host controller 300 only complete data packets are routed through the decryption and CRC checking pipelined circuits 180, 182, thereby allowing standard decryption and CRC error checking circuits to be used.

In the event that data packets are sent to the host computer 120 faster than it can process them, packet processing software 310 determines which, if any, data packets to discard.

The host controller 300 of FIG. 5 does not delete any packets, thereby avoiding the disadvantages of the host controller 150 of FIG. 3, and uses standard decryption and CRC error check circuits, thereby avoiding the disadvantages of the host controller 200 of FIG. 4.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, data could be stored in the controller's data storage buffer using organization techniques other than linked lists. Other criteria for selecting a partial data packet to be transmitted to the host computer could be used, such as criteria based on the amount of storage space occupied by the partial packets, criteria based on the time that each packet's first cell was received, or random selection criteria. Furthermore, the data paths used in the preferred embodiment could be modified in various ways well known to those skilled in the art.

What is claimed is:

1. A network packet receiver, comprising:
   receiver means for receiving interleaved streams of data cells, each stream of data cells comprising a data packet; each said data packet incorporating an embedded error checking value to enable error checking thereof;
   a data buffer, coupled to said receiver means, for storing said received streams of data cells;
   logic means, coupled to said receiver means, for determining when a complete data packet has been received and stored in said data buffer;
   packet processing means, coupled to said data buffer and said logic means, for retrieving a complete data packet from said data buffer, error checking said retrieved complete data packet, and transmitting the data packet to a host computer;
   said logic means including space counting means for detecting when said data buffer has less than a threshold amount of free space remaining for storing received data cells, and overflow prevention logic, responsive to said space counting means, for selecting an incomplete data packet stored in said data buffer and for transmitting said incomplete data packet to said host computer without error checking said incomplete data packet;
   said logic means further including partial packet handling means for transmitting subsequent portions of said incomplete data packet to said host computer, without error checking said subsequent portions of said incomplete data packet, until said host computer receives a complete data packet; and
   loopback means, coupled to said packet processing means, for receiving from said host computer said complete data packet, and for transmitting said complete data packet through said packet processing means back to said host computer.

2. The network packet receiver of claim 1, wherein said data buffer stores each distinct received stream of data cells as a separate linked list of data blocks.

3. A network packet receiver, comprising:
   receiver means for receiving interleaved streams of data cells, each stream of data cells comprising a data packet that includes encrypted data; each said data packet incorporating an embedded error checking value to enable error checking thereof;

a data buffer, coupled to said receiver means, for storing said received streams of data cells;

logic means, coupled to said receiver means, for determining when a complete data packet has been received and stored in said data buffer;

packet processing means, coupled to said data buffer and said logic means, for retrieving a complete data packet from said data buffer, error checking said retrieved complete data packet, and transmitting the data packet to a host computer;

said logic means including space counting means for detecting when said data buffer has less than a threshold amount of free space remaining for storing received data cells, and overflow prevention logic, responsive to said space counting means, for selecting an incomplete data packet stored in said data buffer and for transmitting said incomplete data packet to said host computer without error checking said incomplete data packet;

said logic means further including partial packet handling means for transmitting subsequent portions of said incomplete data packet to said host computer, without error checking said subsequent portions of said incomplete data packet, until said host computer receives a complete data packet; and loopback means, coupled to said packet processing means, for receiving from said host computer said complete data packet, and for transmitting said complete data packet through said packet processing means back to said host computer;

said packet processing means including means for decrypting said retrieved complete data packet before transmitting the retrieved data packet to a host computer, and for decrypting data packets transmitted therethrough by said loopback means.

4. The network packet receiver of claim 3, wherein said data buffer stores each distinct received stream of data cells as a separate linked list of data blocks.

5. A network packet receiver, comprising:

receiver means for receiving interleaved streams of data cells, each stream of data cells comprising a data packet; each said data packet incorporating an embedded error checking value to enable error checking thereof;

a data buffer, coupled to said receiver means, for storing each distinct received stream of data cells as a separate linked list of data blocks;

logic means, coupled to said receiver means, for determining when a linked list of data blocks in said data buffer stores a complete data packet;

packet processing means, coupled to said data buffer and said logic means, for error checking the data blocks comprising a complete data packet and for transmitting the data packet to a host computer;

said logic means including space counting means for detecting when said data buffer has less than a threshold number of data blocks remaining for storing received data cells, and overflow prevention logic, responsive to said space counting means, for selecting a linked list of data blocks in said data buffer comprising an incomplete data packet and for transmitting said incomplete data packet to said host computer without error checking said incomplete data packet;

said logic means further including partial packet handling means for transmitting subsequent portions of said incomplete data packet to said host computer, without error checking said subsequent portions of said incomplete data packet, until said host computer receives a complete data packet; and loopback means, coupled to said data packet processing means, for receiving from said host computer said complete data packet, and for transmitting said complete data packet through said packet processing means back to said host computer.

6. A network packet receiver, comprising:

receiver means for receiving interleaved streams of data cells, each stream of data cells comprising a data packet that includes encrypted data; each said data packet incorporating an embedded error checking value to enable error checking thereof;

a data buffer, coupled to said receiver means, for storing each distinct received stream of data cells as a separate linked list of data blocks;

logic means, coupled to said receiver means, for determining when a linked list of data blocks in said data buffer stores a complete data packet;

packet processing means, coupled to said data buffer and said logic means, for error checking the data blocks comprising a complete data packet and for transmitting the data packet to a host computer;

said logic means including space counting means for detecting when said data buffer has less than a threshold number of data blocks remaining for storing received data cells, and overflow prevention logic, responsive to said space counting means, for selecting a linked list of data blocks in said data buffer comprising an incomplete data packet and for transmitting said incomplete data packet to said host computer without error checking said incomplete data packet;

said logic means further including partial packet handling means for transmitting subsequent portions of said incomplete data packet to said host computer, without error checking said subsequent portions of said incomplete data packet, until said host computer receives a complete data packet; and loopback means, coupled to said packet processing means, for receiving from said host computer said complete data packet, and for transmitting said complete data packet through said packet processing means back to said host computer;

said packet processing means including means for decrypting said retrieved complete data packet before transmitting the retrieved data packet to a host computer, and for decrypting data packets transmitted therethrough by said loopback means.

7. A method of receiving data packets from a communications network, the steps of the method comprising:

receiving interleaved streams of data cells, each stream of data cells comprising a data packet; each said data packet incorporating an embedded error checking value to enable error checking thereof;

storing, in a data buffer, each received stream of data cells;

determining when a complete data packet has been received and stored in said data buffer;

retrieving a complete data packet from said data buffer, error checking said retrieved complete data packet, and transmitting the data packet to a host computer;

detecting when said data buffer has less than a threshold amount of free space remaining for storing received data cells, then selecting an incomplete data packet stored in said data buffer and transmitting said incomplete data packet to said host computer without error checking said incomplete data packet;

transmitting subsequent portions of said incomplete data packet to said host computer, without error checking said subsequent portions of said incomplete data packet, until said host computer receives a complete data packet; and receiving from said host computer, via a loopback path, said complete data packet, and then error checking the complete data packet and transmitting the data packet back to said host computer.

8. The method of claim 7, wherein said storing step stores each distinct received stream of data cells in said data buffer as a separate linked list of data blocks.

9. A method of receiving data packets from a communications network, the steps of the method comprising:

receiving interleaved streams of data cells, each stream of data cells comprising a data packet that includes encrypted data; each said data packet incorporating an embedded error checking value to enable error checking thereof;

storing, in a data buffer, each received stream of data cells;

determining when a complete data packet has been received and stored in said data buffer;

retrieving a complete data packet from said data buffer, decrypting and error checking said retrieved complete data packet, and transmitting the retrieved, decrypted data packet to a host computer;

detecting when said data buffer has less than a threshold amount of free space remaining for storing received data cells, then selecting an incomplete data packet stored in said data buffer and transmitting said incomplete data packet to said host computer without error checking said incomplete data packet;

transmitting subsequent portions of said incomplete data packet to said host computer, without error checking said subsequent portions of said incomplete data packet, until said host computer receives a complete data packet; and receiving from said host computer, via a loopback path, said complete data packet, and then decrypting and error checking said complete data packet and transmitting said received data packet back to said host computer.

10. The method of claim 9, wherein said storing step stores each distinct received stream of data cells in said data buffer as a separate linked list of data blocks.

11. A method of receiving data packets from a communications network, the steps of the method comprising:

receiving interleaved streams of data cells, each stream of data cells comprising an encrypted data packet; each said encrypted data packet incorporating an embedded error checking value to enable error checking thereof;

storing, in a data buffer, each distinct received stream of data cells as a separate linked list of data blocks;

determining when a linked list of data blocks in said data buffer stores a complete encrypted data packet;

decrypting and error checking the data blocks comprising a complete encrypted data packet and transmitting the decrypted data packet to a host computer;

detecting when said data buffer has less than a threshold number of data blocks remaining for storing received data cells, and then selecting a linked list of data blocks in said data buffer comprising an incomplete data packet and transmitting said incomplete data packet to said host computer without decrypting and error checking said incomplete data packet;

transmitting subsequent portions of said incomplete data packet to said host computer, without decrypting and error checking said subsequent portions of said incomplete data packet, until said host computer receives a complete encrypted data packet; and receiving from said host computer, via a loopback path, said complete encrypted data packet, and then decrypting and error checking the complete encrypted data packet and transmitting the decrypted data packet back to said host computer.

* * * * *